E. A. IVATTS.
KINEMATOGRAPHIC APPARATUS.
APPLICATION FILED JAN. 4, 1910.
1,113,351.
Patented Oct. 13, 1914.
Fig.1
Fig.2
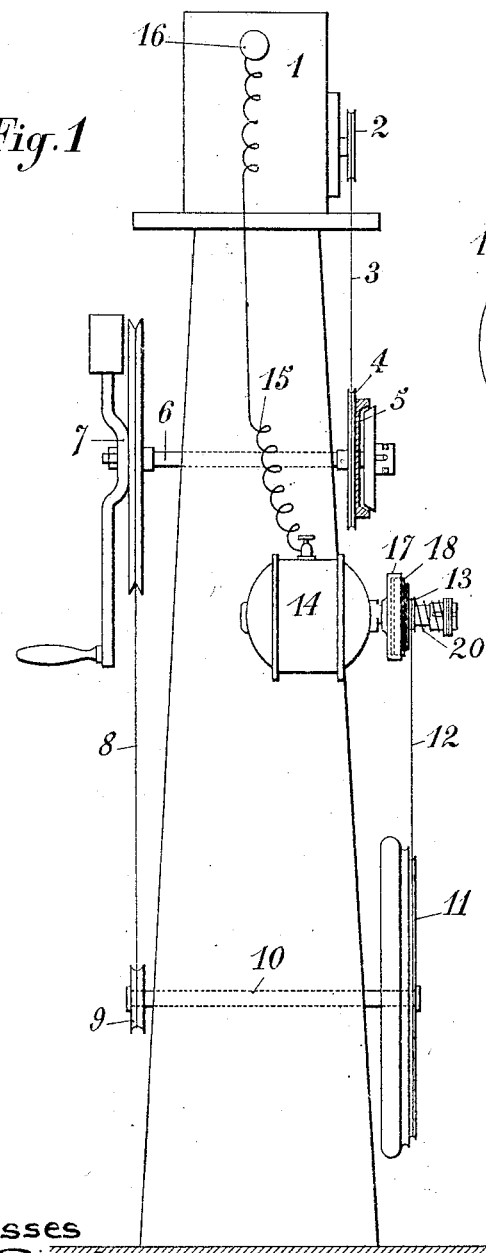
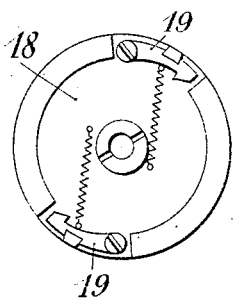
Witnesses
Inventor

UNITED STATES PATENT OFFICE.

ERNEST ALBERT IVATTS, OF PARIS, FRANCE, ASSIGNOR TO SOCIETY: COMPAGNIE GENERALE DE PHONOGRAPHES CINEMATOGRAPHES ET APPAREILS DE PRECISION, OF PARIS, FRANCE.

KINEMATOGRAPHIC APPARATUS.

1,113,351. Specification of Letters Patent. Patented Oct. 13, 1914.

Application filed January 4, 1910. Serial No. 536,281.

*To all whom it may concern:*

Be it known that I, ERNEST ALBERT IVATTS, citizen of Great Britain, residing at Paris, in the Department of the Seine and State of France, have invented certain new and useful Improvements in Kinematographic Apparatus, of which the following is a specification.

This invention refers to a kinematographic apparatus provided with means for producing the electric energy necessary for exhibiting the films. At present for lighting kinematographic apparatus of small dimensions such as apparatus for amateurs, or toys, small incandescent lamps with metallic filaments are used which, besides having the various advantages resulting from the use of electricity as compared with other sources of light, have the advantage of giving a very white light and of consuming little current. With short filaments these lamps will work at very low voltages and consequently can be fed by a few accumulators or cells.

The invention forming the subject matter of the present application is for dispensing with the use of a source of electricity that is independent of the apparatus and consequently all the inconveniences connected with the transport, the use and the keeping in working order of accumulators or cells; it essentially consists in adding to the kinematographic apparatus a small dynamo or magneto driven by the mechanism rotating the film and of sufficient power to feed, for example, a small incandescent lamp for producing the light for exhibiting the pictures.

I shall now describe my invention with reference to the accompanying drawing showing one form of construction of the same and in which:

Figure 1 is a diagrammatic view in elevation, Fig. 2 is a detail showing the control device which limits the force applied to the generator. Fig. 3 is a longitudinal detail section through the brake controller for the generator.

Referring to the drawing, 1 is the kinematograph; 2 the pulley for driving the film; 3 is a transmission belt passing over a pulley 4 keyed to a clutch 5, and driven by a shaft 6 provided with a counter-weighted crank handle 7 attached to a flywheel. This crank fly wheel 7 serves as a driving pulley for driving by means of a belt 8 the pulley 9 keyed to a shaft 10, at the end of which shaft 10 a pulley 11 is mounted which, by the intermediary of a belt 12 drives the pulley 13 of a dynamo 14. The current produced is sent through wires 15 to a suitable incandescent lamp 16. A fixed drum 17 is integral with the casing of the generator; 18 is a revoluble plate carrying the weights 19, this plate being fixed to the shaft of the dynamo; 13 is a pulley for driving by friction, which friction is regulated by means of a screw 21 exerting pressure on a spring 20. The weights 19 are provided with plugs of leather intended to rub against the drum 17, thereby assuring the slackening of the driving. These parts 19 coöperate with a contact spring 20. The clutch 5 arranged on the shaft of the crank is for the purpose of preventing the unwinding of the film immediately on starting the apparatus, as it is necessary that the crank should first rotate the dynamo. As soon as the lamp is burning normally, the crank 7 is pushed home as far as it will go and by means of the clutch 5 the starting of the rotary mechanism is effected.

It is evident that various modifications of detail and arrangements can be effected in the apparatus, that shown being only one form of construction.

Having now particularly described and ascertained the nature of my said invention and in what manner the same is to be performed I declare that what I claim is:

1. The combination in a kinematographic apparatus, of an electric lamp for illuminating the film, an electrical generator for furnishing current for said lamp, and a driving shaft geared to the film-operating mechanism and also to the electrical generator.

2. The combination in a kinematographic apparatus, of an electric lamp for illuminating the film, an electrical generator for furnishing current for said lamp, a driving shaft geared both to the film-operating mechanism and to the electrical generator, and clutches enabling the electrical generator to be started before the film-operating mechanism is set in motion.

3. The combination in a kinematographic apparatus, of an electric lamp for illuminating the film, an electrical generator for furnishing current for said lamp, a power shaft for driving both the film-operating mechanism and the electrical generator, clutches for connecting said two sets of devices with said shaft, and an automatic brake adapted to regulate and maintain a constant rate of rotation of the rotor of said electrical generator.

4. The combination in a kinematographic apparatus, of an electric lamp for illuminating the film, an electrical generator for furnishing current to said lamp, a driving shaft, a pulley for actuating the film-moving mechanism, a pulley on the shaft of the electrical generator, and operative connections between said pulleys and the driving shaft.

5. The combination in a kinematographic apparatus, of an electric lamp for illuminating the film, an electrical generator for furnishing the current to said lamp, and driving connections between the generator and a shaft of the kinematograph whereby light for illuminating the film is generated simultaneously with the operation of the kinematograph by the same source of power.

In testimony whereof I affix my signature in presence of two witnesses.

ERNEST ALBERT IVATTS.

Witnesses:
HENRY DUNBAR,
LUCIEN CRESPIN.